Reissued Jan. 25, 1949

Re. 23,080

UNITED STATES PATENT OFFICE 23,080

LETHAL COMPOSITION FOR INSECTS

Howard W. Eck, deceased, late of East Lansing, Mich., by Lowell B. Kilgore and Helen Ford Kilgore, Washington, D. C., assignees, and Jared H. Ford, Kalamazoo, Mich.

No Drawing. Original No. 2,310,949, dated February 16, 1943, Serial No. 266,035, April 4, 1939. Application for reissue August 8, 1947, Serial No. 767,602

20 Claims. (Cl. 167—24)

This invention relates to a new composition of matter useful for killing insect pests such as flies, mosquitoes, moths, roaches and the like.

Most liquid contact insecticide sprays are an extract of pyrethrum flowers in a diluent vehicle such as a petroleum distillate. Such pyrethrum insecticide confronts a manufacturer with the necessity of importing, at considerable expense, a crude botanical, the active ingredients of which are unstable and variable. Such a hazardous source of supply, and of quality, coupled with attendant unpredictable fluctuations in price has been onerous to manufacturers of liquid contact insecticides who rely on pyrethrum for the principal active ingredient of their product. More recently, an insecticidal spray has been prepared synthetically by diluting a suitable organic thiocyanate. This however, introduces undesirable odors, especially at the higher concentrations now required for the so-called "high kill" insecticides.

Contact sprays of pyrethrum or of organic thiocyanate are of a type to induce an initial paralytic effect in insects, but they entail a disadvantage in that at an economic concentration the paralytic effect so produced is only temporary in a large percentage of cases. Hence, a considerable number of the insects sprayed with such an insecticide completely recover.

To avoid this difficulty and obtain the high kill demanded of a modern insecticidal spray, manufacturers have been forced to increase the concentration of these paralytic ingredients to a point where the cost of the spray produces a serious sales resistance.

Hence, an object of our invention is to provide a chemical that will be compatible with the paralytic agents named as well as being capable of supplementing their insecticidal values. Another object is to provide chemicals of such insecticidal activity that a relatively small amount will replace a substantial or major amount of the paralytic agents now required to produce a satisfactory insecticidal spray. A special object of importance is to supplement paralytic agents of insecticidal sprays by new components that are of high lethal value to insects. More particularly, an object is to prepare a new insecticide of improved lethal or killing power. A further object is to provide chemical compounds of high lethal power, but practical for an insecticide. Also an object of our invention is to provide a chemical insecticide synthetically from readily available raw materials and at economical cost. This will render its use economically advisable in liquid insecticides and more particularly effect a substantial savings in replacing a substantive or major part of the pyrethrum or of the thiocyanate paralytic agents now required. Another object of our invention is to produce an insecticidal material that will have also satisfactory concomitant physical properties, such as freedom from odor, color, skin irritation and other untoward physiological effects on warm blooded animals. A special object, further, is the production of certain new and useful chemical compounds.

These and other objects will appear in the illustrated description of this invention more fully to be set forth, and defined in the appended claims.

Attainment of these objects is a result of our discoveries concerning organic chemical compounds of an indandione type. These may be expressed in terms of their structural formula:

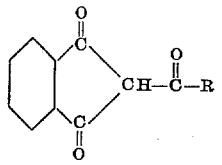

in which R is a hydrocarbon radical. We have discovered certain new chemical compounds of this formula, and also have found that all compounds of this type exhibit high lethal power for insects. Moreover, under this invention, small amounts of these lethal compounds exhibit such synergistic effect with the above paralyzing compounds, especially pyrethrum, as to produce exceedingly useful insecticides. This invention utilizes small quantities of these indandione compounds with dilute solutions of pyrethrum extract to obtain an insecticide having the combined properties of rapid paralysis plus high killing power.

Under preferred practice of this invention appropriate quantities of these indandione compounds are distributed in a base for contacting insects. It will be illustrative to refer to pyrethrum extract dissolved in kerosene as a base, but without limitation either to pyrethrum or to kerosene, as other paralyzing chemicals are being developed and other solvents or also emulsified bases. These are typical of a paralyzing insecticide and a volatile solvent well known in this art; a 2.5% solution in kerosene of a 20:1 pyrethrum extract serves as an illustrative standard. Examples will serve to describe various compositions of this invention. In a preferred composition under this invention the indandione compound, 2-isovaleryl-1,3-indandione, is of outstanding value.

These examples are expressed in terms familiar in the art as "knockdown" and as "kill" power. They are evaluated according to present standard procedures, utilizing the so-called Peet-Grady method. In this a group of 100 flies is released within a gas chamber 6 x 6 x 6 feet; then 12 cc. of the solution for test is sprayed into the chamber with a De Vilbiss atomizer, Special No. 5004. At the end of ten minutes the chamber is ventilated and the flies that have been knocked down are transferred to an observation cage and supplied with food. At the end of twenty-four hours the number of dead and living flies are determined. The number of flies on the floor of the chamber in 10 minutes will hereinafter be designated as the "knockdown" and the number dead at the end of 24 hours as the "kill."

It is well known that the resistance of house flies to insecticides varies widely. In order to compensate for this variation, concurrent checks in the resistance of the flies to standard pyrethrum insecticide were run on a group of 100 flies from the same cage as those used in testing the unknown sample. The order of the test was such that every unknown sample had a control group of 100 flies tested immediately before or immediately after it. The standard pyrethrum insecticide used as a control was the official test insecticide of the National Association of Insecticide and Disinfectant Manufacturers. This official test insecticide represents the average product that is obtained by diluting one part of 20:1 pyrethrum concentrate with nineteen parts of a deodorized kerosene having a boiling range of approximately 345° to 510° F.

The results obtained from a pair of tests, that is, one test on the unknown sample and one test on the official insecticide, were then adjusted statistically to the basis of a 50% kill for the official test insecticide by the method published by one of us in Soap magazine, June, 1937, page 116. Thus, if a pair of tests that were run on two groups of 100 flies taken from the same cage gave a 60% kill for the O. T. I. and 90% kill for the sample, the adjusted kill for the sample on the basis of a 50% kill for the O. T. I. would be 85%. In the following tables all the figures for per cent kill are so adjusted.

EXAMPLE I

The following table shows the kills which may be obtained by adding to solutions of 2½% 20:1 pyrethrum concentrate in deodorized kerosene various members of the series—

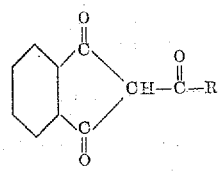

wherein R is a hydrocarbon radical.

TABLE I

| Test No. | Material and Concentration | 10 Min. Knock-down | 24 Hr. Kill |
|---|---|---|---|
| | | *Percent* | *Percent* |
| 1 | 2.5% 20:1 pyrethrum concentrate | 99.9 | 25 |
| 2 | 2.5% 20:1 pyrethrum concentrate +0.5 g./100 cc. 2-Acetyl-1,3-indandione | 100 | 46 |
| 3 | 2.5% 20:1 pyrethrum concentrate +0.5 g./100 cc. 2-propionyl-1,3-indandione | 100 | 66 |
| 4 | 2.5% 20:1 pyrethrum concentrate +0.5 g./100 cc. 2-butyryl-1,3-indandione | 100 | 73 |
| 5 | 2.5% 20:1 pyrethrum concentrate +0.5 5./100 cc. 2-isobutyryl-1,3-indandione | 97.5 | 65 |
| 6 | 2.5% 20:1 pyrethrum concentrate +1.0 g./100 cc. 2-isovaleryl-1,3-indandione | 100 | 93 |
| 7 | 2.5% 20:1 pyrethrum concentrate +0.5 g./100 cc. 2-isovaleryl-1,3-indandione | 100 | 89 |
| 8 | 2.5% 20:1 pyrethrum concentrate +0.25 g./100 cc. 2-isovaleryl-1,3-indandione | 100 | 67 |
| 9 | 2.5% 20:1 pyrethrum concentrate +0.5 g./100 cc. 2-n-valeryl-1,3-indandione | 99.6 | 76 |
| 10 | 2.5% 20:1 pyrethrum concentrate +0.5 g./100 cc. 2-trimethylacetyl-1,3-indandione | 100 | 80 |
| 11 | 2.5% 20:1 pyrethrum concentrate +0.5 g./100 cc. 2-caproyl-1,3-indandione | 100 | 63 |
| 12 | 2.5% 20:1 pyrethrum concentrate +0.5 g./100 cc. 2-hexahydrobenzoyl-1,3-indandione | 100 | 61 |
| 13 | 2.5% 20:1 pyrethrum concentrate +0.5 g./100 cc. 2- (2-phenylethyl)-1,3-indandione | 99.6 | 42 |
| 14 | 2.5% 20:1 pyrethrum concentrate +0.5 g./100 cc. 2-benzoyl-1,3-indandione | 100 | 55 |
| 15 | 2.5% 20:1 pyrethrum concentrate +1% residue obtained from the Claisen condensation between dimethyl phthalate and methyl isobutyl ketone as described in Example III | 99.9 | 63 |
| 16 | 2.0 g./100 cc. 2-isovaleryl-1,3-indandione | 96 | 96 |

The above examples show the use of these compounds with pyrethrum, except that Examples 1 and 16 are respectively for pyrethrum alone and the indandione compound alone. The compounds when used alone are effective killing agents but are somewhat delayed in their action. In the last example, it is to be noted that although the knockdown was inferior to the samples containing pyrethrum, the material killed practically all of the flies that it knocked down, while in the first example the 2.5% of 20:1 pyrethrum concentrate gave a complete knockdown but 75% of the flies recovered. The compounds are more useful when incorporated with a material such as pyrethrum which paralyzes the flies rapidly.

In these insecticides, lethal effect is imparted generally by indandione compounds of the formula—

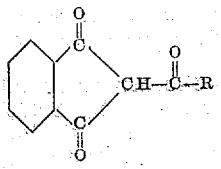

wherein R is a butyl group generally; that is, normal butyl, isobutyl, secondary butyl, or tertiary butyl.

The combination of these compounds with pyrethrum produces a synergistic effect, that is to say, more than the additive effect of the two ingredients. This effect may be demonstrated by using a paralyzing agent other than the type of pyrethrum to obtain the rapid knockdown. Thus, in Table II, we have shown the results of kill tests run on comparatively weak solutions of pyrethrum extract and β-butoxy-β′-thiocyanodiethyl ether concentrate, said concentrate comprising approximately 50% of the active compound in kerosene. Pyrethrum or β-butoxy-β′-thiocyano-di-ethyl ether when used by themselves give approximately the same kill. However, when an equal amount of one of the members of the series—

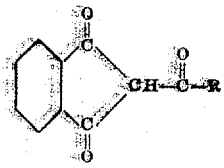

for example 2-isovaleryl-1,3-indandione, is added to each of the solutions, there is a marked difference in the kill power of the mixture. In the case of β-butoxy-β′-thiocyanodi-ethyl ether the killing strength of the mixture was merely additive while in the case of the pyrethrum solution a synergistic effect was produced.

TABLE II

*Synergistic effect when used with pyrethrum*

| Material and Concentration | Kill |
|---|---|
| | *Percent* |
| 2.5% pyrethrum concentrate | 25 |
| 2% β-butoxy-β′-thiocyanodi-ethyl ether concentrate | 23 |
| 2.5% 20:1 pyrethrum concentrate+0.5 g./100 cc. 2-isovaleryl 1, 3-indandione | 89 |
| 2% β-butoxy-β′-thiocyanodi-ethyl ether concentrate +0.5 g./100 cc. 2-isovaleryl-1,3-indandione | 68 |
| 2.5% 20:1 pyrethrum concentrate+0.5 g./100 cc. 2 butyryl-1, 3-indandione | 73 |
| 2% β-butoxy-β′-thiocyanodi-ethyl ether concentrate +.5 g./100 cc. 2-butyryl-1,3-indandione | 31 |
| 2.5% 20:1 pyrethrum concentrate +0.5 g./100 cc. 2-hexahydrobenzoyl-1,3-indandione | 61 |
| 2% β-butoxy-β′-thiocyanodi-ethyl ether concentrate + 2-hexahydrobenzoyl-1,3-indandione | 54 |

Compounds of the type—

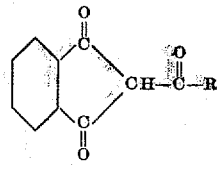

are suitably prepared by Claisen condensation between an ester of phthalic acid and a methyl ketone, using the usual condensing agents for this Claisen condensation such as a metallic sodium or potassium or their corresponding alcoholates.

An illustrative example is:

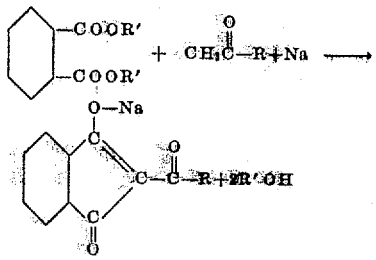

wherein R is a hydrocarbon radical and R′ is an alkyl radical.

For example, we have prepared the compound 2-isovaleryl-1,3-indandione (where R is the isovaleryl radical) by the following method:

EXAMPLE II

A mixture of 194 parts (all parts given by weight) dimethyl phthalate and 100 parts methyl isobutyl ketone is diluted with 400 parts of dry benzene and 23 parts of metallic sodium is added in small pieces. When the sodium has dissolved, the reaction mixture is extracted with water and the aqueous extracts acidified. A yellow brown oil separates and crystallizes upon standing. Upon recrystallization from methanol, a light yellow solid, melting at 67°, is obtained. The carbon-hydrogen analysis and neutral equivalent indicate that this compound is 2-isovaleryl-1,3-indandione.

*Carbon-hydrogen analysis.*—Calculated for $C_{14}H_{14}O_3$: carbon 73.00%, hydrogen 6.24%. Found: carbon 73.01%, hydrogen 6.13%.

*Molecular weight (Rast).*—Calculated 230. Found 207.

*Neutral equivalent calculated.*—230. Found 225, 229.

The structural formula of 2-isovaleryl-1,3-indandione is:

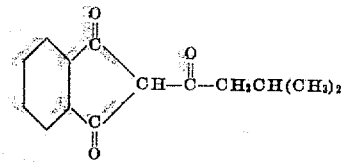

The other members of the series of compounds under this invention may be prepared in similar manner. In some cases, where the final compounds themselves were not crystalline, they were purified by recrystallizing their salts (for example, sodium salts) and then acidifying.

The following table lists illustrative compounds of the series—

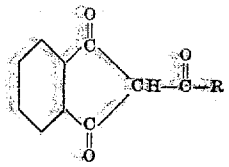

described as insecticidals in Example I, the ketones from which they were prepared and the melting point of the final products. These substantiate the broad designation of R by the term hydrocarbon.

TABLE III

| | R of the Type formula | Compound | Ketone | Melting Point |
|---|---|---|---|---|
| Alkyl | $CH_3$ | 2-acetyl-1,3-indandione | Acetone | 109°-110° |
| Do | $C_2H_5$ | 2-propionyl-1,3-indandione | Methyl ethyl ketone | 101° |
| Do | $C_3H_7$ | 2-butyryl-1,3-indandione | Methyl propyl ketone [1] | Oil |
| Do | i-$C_3H_7$ | 2-isobutyryl-1,3-indandione | Methyl isopropyl ketone | |
| Do | n-$C_4H_9$ | 2-n-valeryl-1,3-indandione | Methyl n-butyl ketone | Oil |
| Do | i-$C_4H_9$ | 2-isovaleryl-1,3-indandione | Methyl isobutyl ketone | 67° |
| Do | t-$C_4H_9$ | 2-trimethylacetyl-1,3-indandione | Pinacolone | 109°-110° |
| Do | n-$C_5H_{11}$ | 2-caproyl-1,3-indandione | Methyl n-amyl ketone | 37°-38° |
| Cyclo alkyl | Cyclo-$C_6H_{11}$ | 2-hexahydrobenzoyl-1,3-indandione | Methyl cyclohexyl ketone | 79°-80° |
| Aralkyl | $C_6H_5CH_2CH_2$ | 2-(2-phenylethyl)-1,3-indandione | 4-phenyl-2-butanone | 77° |
| Aryl | $C_6H_5$ | 2-benzoyl-1,3-indandione | Acetophenone | 103°-106° |

[1] Technical methyl propyl ketone used. This was a mixture of about 75% methyl n-propyl ketone and 25% diethyl ketone.

This invention is not restricted to the use of pure forms of compounds of the type—

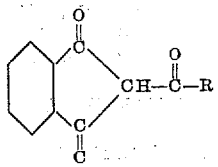

The crude product obtained from the Claisen condensation of a dialkyl phthalate with a methyl ketone may be incorporated directly in an insecticide without isolating and purifying the pure compound. The following example will show how this may be done:

EXAMPLE III

A mixture of 194 parts (all parts given by weight) of dimethyl phthalate and 100 parts methyl isobutyl ketone is diluted with 400 parts of dry benzene, and 23 parts of metallic sodium are added in small pieces. When the sodium has dissolved, the reaction mixture is agitated thoroughly with a slight excess of dilute acid. The benzene layer is separated, washed with water and the wet benzene removed under reduced pressure. One part of the resulting brown, sticky residue was shaken with 99 parts of petroleum distillate containing 2½% 20:1 pyrethrum concentrate. A small amount of insoluble material was filtered out and the resulting solution bioassayed by the Peet-Grady method. The resulting insecticide gave a 63% kill.

Furthermore, we have found that the compounds of the type—

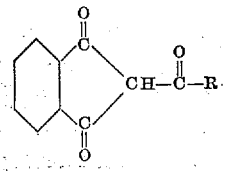

wherein R is a hydrocarbon radical are quite stable towards sunlight. It is well known that extracts of botanical insecticides such as pyrethrum, derris, cubé and the like, are very unstable in the presence of sunlight and their effectiveness as insecticides is rapidly destroyed. The following example demonstrates the stability of our compounds:

EXAMPLE IV

Two hundred cubic centimeters of deodorized kerosene containing 2.0 grams of 2-isovaleryl-1,3-indandione were placed in a bottle made of Corex glass, a special glass which transmits a large percentage of the shorter wave lengths of light which have been found to be especially destructive to pyrethrum and rotenone. The bottle was placed outdoors on the south side of the building where it received the direct sunlight whenever the weather was clear. The bottle was allowed to remain outside from February 18 to March 20. At the end of this time 2½% of 20:1 pyrethrum concentrate was added. If no decomposition had occurred, the material would have given the same kill that it did before being exposed to the sunlight, namely, 98% (see Example I, test No. 6). Actually, it was found to give a 94% kill.

Thus, it is evident that these new insecticidals are useful not only for household use, but also out of doors in the sunlight, and for use on plants or trees where rotenone is unsatisfactory.

In the foregoing description this invention has been illustrated by compositions in which petroleum distillates serve as distributing means or diluent for these new insecticidal materials. However, this invention is applicable also to use of other distributing means such as aqueous emulsions or organic emulsions, or also powders that may serve as distributing agents.

While this invention has been described by illustrative, preferred examples in accordance with the patent statutes, it will now be apparent to those skilled in this art that the principles of this invention may be embodied in other forms than those specifically set forth, but within the scope of the appended claims.

What we claim is:

1. An insecticide comprising an insect-paralyzing agent intermixed with a compound of the type—

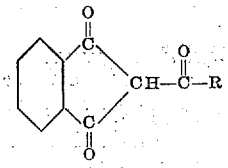

wherein R is a hydrocarbon radical, the compound serving to impart lethal qualities to the insecticide.

2. An insecticide comprising an insect-paralyzing agent and a compound of the type—

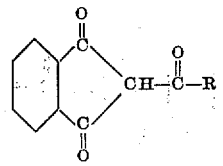

wherein R is a butyl group, the compound serving to impart lethal quality to the insecticide.

3. An insecticide comprising an insect-paralyzing agent and a compound of the type—

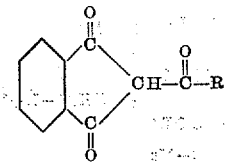

wherein R is the isobutyl group, the compound serving to impart lethal qualities to the insecticide.

4. An insecticide comprising pyrethrum and 2-isovaleryl-1,3-indandione, the indandione compound serving to impart lethal qualities to the insecticide.

5. An insecticidal composition of matter comprising a compound of the type:

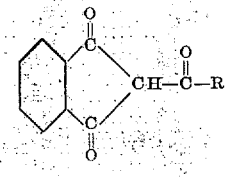

wherein R is a butyl group, the compound serving to impart lethal qualities to the composition.

6. An insecticidal composition of matter comprising a compound of the type:

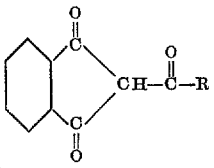

wherein R is a branched chain butyl group, the compound serving to impart lethal qualities to the composition.

7. An insecticidal composition of matter comprising 2-isovaleryl-1,3-indandione, the compound serving to impart lethal qualities to the composition.

8. An insecticidal composition of matter comprising 2 - trimethylacetyl - 1,3 - indandione, the compound serving to impart lethal qualities to the composition.

9. An insecticidal composition of matter comprising a compound of the type:

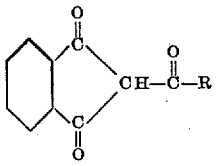

wherein R is a butyl group and a carrier therefor, the indandione compound serving to impart lethal qualities to the composition.

10. An insecticidal composition of matter comprising a compound of the type:

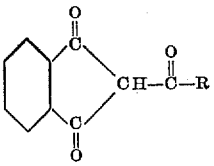

wherein R is a branched chain butyl group and a carrier therefor, the indandione compound serving to impart lethal qualities to the composition.

11. An insecticidal composition of matter comprising a compound of the type:

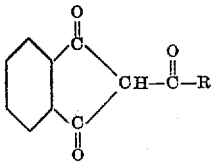

wherein R is a butyl group, dissolved in kerosene, the indandione compound serving to impart lethal qualities to the composition.

12. An insecticide comprising an insect paralyzing agent and 2-trimethylacetyl-1,3-indandione compound serving to impart lethal quality to the insecticide.

13. An insecticide comprising pyrethrum and 2-trimethylacetyl-1,3-indandione, the indandione compound serving to impart lethal quality to the insecticide.

14. An insecticide comprising pyrethrum and a compound of the type:

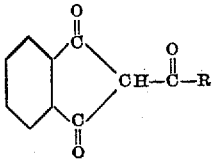

wherein R is butyl, the indandione compound serving to impart lethal quality to the insecticide.

15. An insecticidal composition of matter comprising a compound of the type:

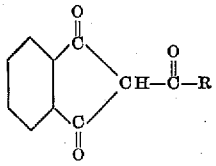

wherein R is alkyl containing at least 4 carbon atoms, the compound serving to impart lethal qualities to the composition, and a carrier therefor.

16. An insecticidal composition of matter comprising a compound of the type:

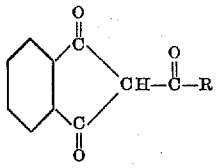

wherein R is alkyl containing at least 4 carbon atoms, the compound serving to impart lethal qualities to the composition.

17. An insecticidal composition of matter comprising a compound of the type:

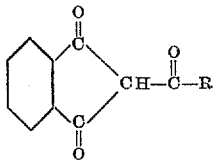

wherein R is amyl, the compound serving to impart lethal qualities to the composition.

18. An insecticidal composition of matter comprising, 2-n-caproyl-1,3-indandione, the compound serving to impart lethal qualities to the composition.

19. An insecticide comprising an insect paralyzing agent and a compound of the type:

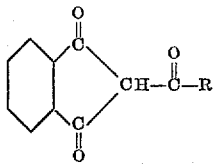

wherein R is alkyl containing at least 4 carbon atoms, the compound serving to impart lethal qualities to the composition.

20. An insecticide comprising pyrethrum and a compound of the type:

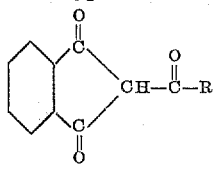

wherein R is alkyl containing at least 4 carbon atoms, the compound serving to impart lethal qualities to the composition.

LOWELL B. KILGORE,
HELEN FORD KILGORE,
*Assignees of Howard W. Eck, Deceased.*
JARED H. FORD,
*Co-inventor.*

REFERENCES CITED

The following references are of record in the file of this patent:

Schwerin-Berichte, 27, pages 104–107, 109, 110.